Nov. 21, 1961   R. L. SJÖSTRÖM   3,010,005
FABRIC CUTTER AND SEALER
Filed Feb. 10, 1961   2 Sheets-Sheet 1

INVENTOR.
ROBERT L. SJÖSTRÖM
BY
Ezekiel Wolf, Wolf & Greenfield
ATTORNEYS

Nov. 21, 1961  R. L. SJÖSTRÖM  3,010,005
FABRIC CUTTER AND SEALER

Filed Feb. 10, 1961  2 Sheets-Sheet 2

INVENTOR.
ROBERT L. SJÖSTRÖM
BY
Ezekiel Wolf, Wolf + Greenfield
ATTORNEYS

United States Patent Office 3,010,005
Patented Nov. 21, 1961

3,010,005
FABRIC CUTTER AND SEALER
Robert L. Sjöström, % Sjostrom Machine Co.,
16th St. at 2nd Ave., Boca Raton, Fla.
Filed Feb. 10, 1961, Ser. No. 88,491
4 Claims. (Cl. 219—21)

The present invention relates to a device for cutting fabric, and in particular to a device for severing fabric made of themoplastic synthetic resin fibers such as polyvinyl acetate.

Certain fabrics made of synthetic resin fibers having thermoplastic properties have a tendency to ravel along raw cut edges. Because of this tendency, many clothing, curtain and other manufacturers using these fabrics must make substantial allowances for such raveling. When large quantities of fabrics are used, these allowances are substantial. In addition, loose threads from such raveling create a substantial cleaning problem and fire hazard in factories using these fabrics. Moreover, the edges of articles made from these fabrics will also readily ravel. It is, therefore, highly desirable to provide a means and method of severing such fabric so that the edges will not ravel.

The present invention provides a simple means and method of cutting fabric of thermoplastic resin fibers and simultaneously sealing the cut edges to prevent raveling.

It is also an object of the present invention to provide a means and method of cutting fabric of thermoplastic resin fibers quickly and efficiently and without the necessity of providing margins or allowances along the cut line.

The present invention provides a combination cutting and sealing device having means forming an arcuate knife edge supported by a handle, with heating means adapted to heat and maintain the knife edge at a temperature substantially in excess of the melting point of thermoplastic resin fibers of which the fabric to be cut is made. The present invention also contemplates a structure in which the heatable knife edge is adapted to rotate so that the knife edge rolls over the fabric being cut to maintain the heat at the point of contact substantially uniform.

These and other objects and advantages of the present invention will be more clearly understood when considered in conjunction with the accompanying drawings in which.

Figure 1:
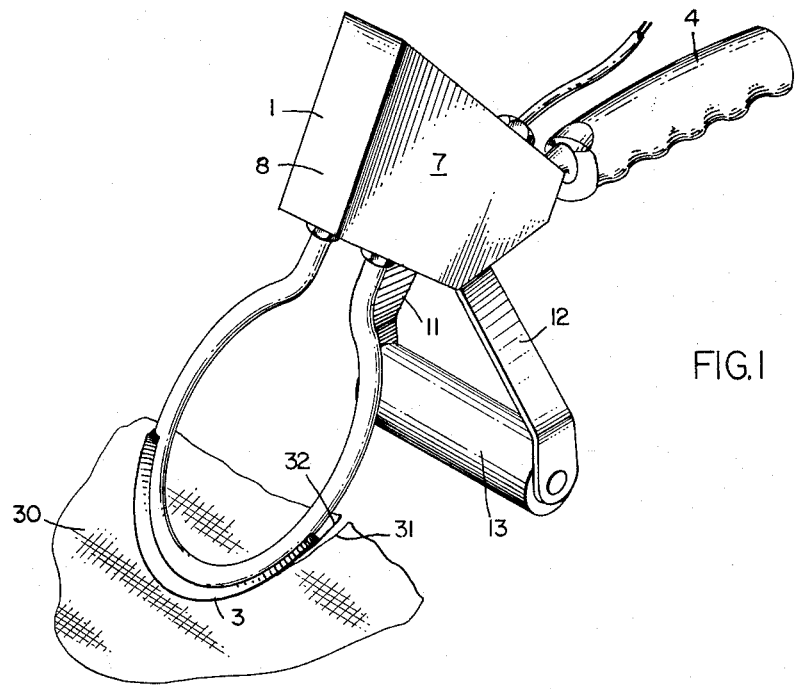
FIG. 1 is a perspective view of a preferred embodiment of the present invention.
Figure 2:
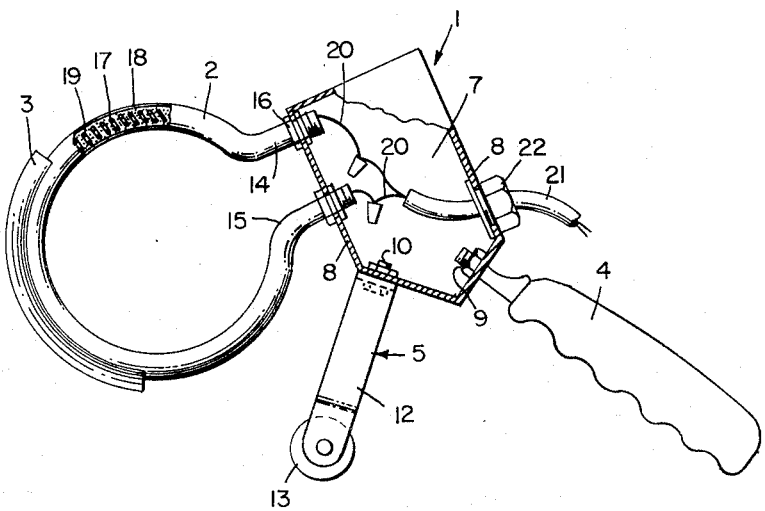
FIG. 2 is a side, partially fragmentary, view of the embodiment illustrated in FIG. 1.

A preferred embodiment illustrated in FIGS. 1 and 2 comprises a casing 1 supporting an arcuate heating member 2 formed with an arcuate knife edge 3. The casing has secured to it a handle 4 and stand 5.

The casing 1 may be formed of any suitable rigid metal or the like and is provided with opposite facing walls illustrated at 7 and continuous side walls illustrated at 8. The handle 4 is suitably secured to a lower side wall by suitable means such as the bolt and nut arrangement 9. Extending angularly from the casing 1 with respect to the handle 4 is the stand 5. This stand may be suitably secured to the casing by nut and bolt means 10. The stand 5 is preferably formed with opposite legs 11 and 12 extending angularly from one another. A roller 13 is journalled at its ends at the lower ends of these legs 11 and 12. The heating member 2 is formed as an arc of almost 360° with the ends 14 and 15 of the member 2 suitably secured to a forward side wall of the casing 1. This heating member preferably should be secured to the casing 1 by heat insulating ceramic insulators 16 to minimize heat conduction through the casing 1. The heating member 2 is formed preferably of an outer sheath 17 of conductive material, preferably Incoloy with a helically coiled Nichrome ressistor wire 18 extending longitudinally through the sheath 17 and embedded within a compacted dielectric material 19. The terminals of the resistor wire 18 are connected to electrical wires 20 within the casing 1. The wires 20 are in turn connected through an electrical cable 21, supported at the rear edge of the casing 1 by a lock nut 22 to a suitable electrical power source (not shown).

The heating element is capable of being heated to 1500° F. Such elements are available commercially from Edwin L. Wiegand Co. of Pittsburgh, Pa., as illustrated in their catalog 60.

Suitably secured to the outer periphery of the heating member 2 by suitable means such as heliarc welding, is an arcuate knife edge 3. This knife edge extends longitudinally of the heating member preferably over an angle of at least 90°. The knife edge is tapered from a base secured to the heating member 2 to a pointed edge which need not be sharp enough to actually cut the fabric but which should have a width preferably no more than approximately $\frac{1}{16}$ of an inch. This knife edge should be formed of copper or stainless steel. Such knife edge is quite important when the device is operated at elevated temperatures to minimize likelihood that the heating element will burn out.

When using the device illustrated in FIGS. 1 and 2, to cut materials such as fabrics of cotton and acetate, the arcuate knife edge is heated by passing current through the resistor wire 18 until a temperature of approximately 1500° F. is reached. The operator then moves the knife edge across the fabric 30 allowing successive incremental portions of the knife edge 3 to engage the fabric. The substantial and constant heat of the knife edge 3 not only burns through the fabric, but also simultaneously seals the edges of the fabric. Thus the severed and sealed edges 31, 32 will not ravel and in fact form a relatively stiff and permanent edge.

Figure 3:
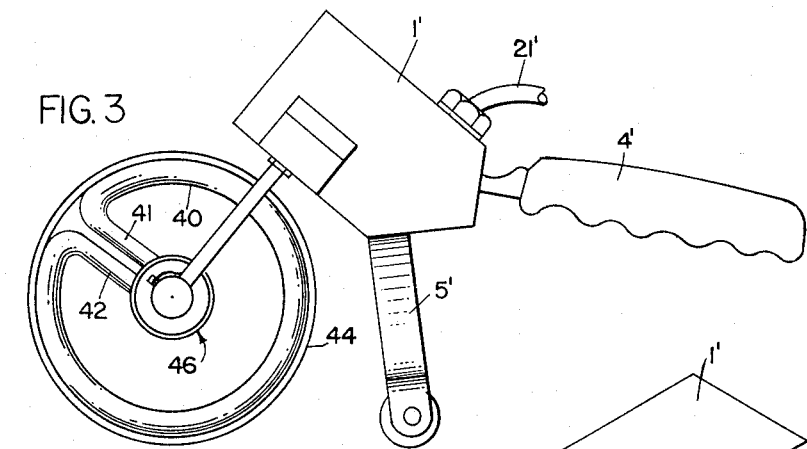
FIG. 3 is a side elevation of a modification of the present invention.
Figure 4:
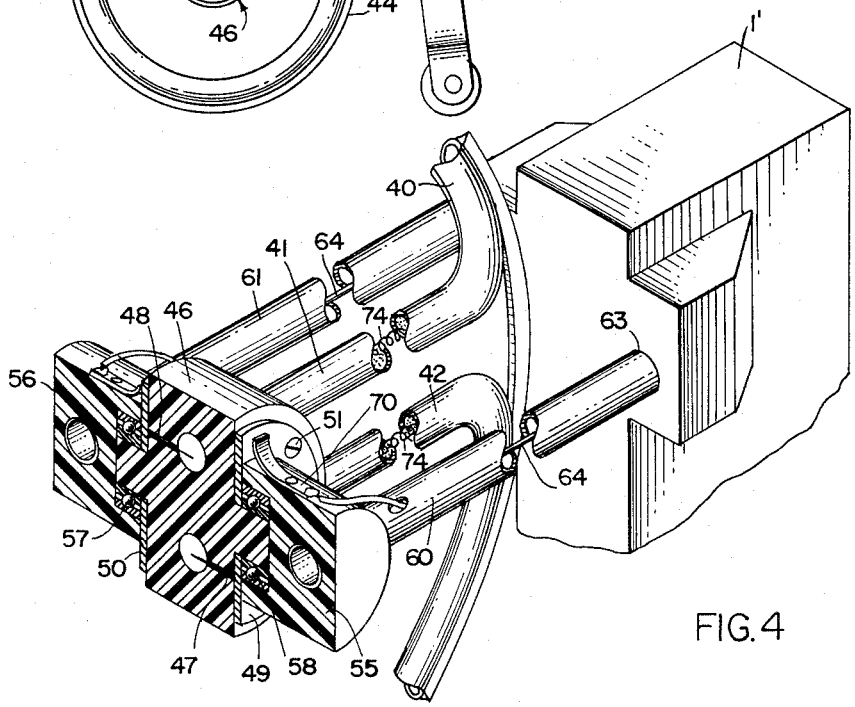
FIG. 4 is a perspective fragmentary detail of the embodiment illustrated in FIG. 3.
Figure 5:
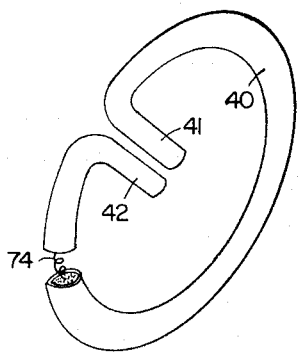
FIG. 5 is a perspective fragmentary detail of the embodiment illustrated in FIG. 3.

The modification shown in FIGS. 3 to 5 is designed for use with heavier fabrics where a greater amount of heat is required to assure a proper cutting and sealing of the fabric material. In this arrangement, the case 1', handle 4', stand 5', cable 21' correspond with similar portions illustrated in FIG. 1. The heating member 40 is formed substantially as a circular member with the ends 41 and 42 of the heating member extending radially inwardly to the center of the heating member 40. The knife edge 44 extends entirely around the heating element 40 and presents a continuous heatable knife edge. This knife edge and heating member 40 are adapted to be rotated upon the hub generally illustrated at 46. The ends 41 and 42 extend into and terminate in the hub 46 formed of a dielectric material. The resistance wire within the heating member 40 is connected at its ends to conductors 47 and 48 which extend outwardly of the hub and are connected respectively to conductive end plates 49 and 50. These conductive end plates 49 and 50 are formed as annular members at either side of the hub 48. They are suitably secured by screws 51 or other means to the hub and are positioned between the hub 46 and insulating supporting journals 55 and 56. These insulating journals support the hub 46 for rotation through ball bearing races 57, 58. The journals 55, 56 are in turn supported at one end of arms 60, 61 which are in turn secured at their other end to the casing 1' as illustrated at 63. The legs 60 are hollow and carry electrical wires 64 internally. These wires are in turn connected at one end to the brushes 70 which engage the end plates 49 and 50. The other ends of the wires 64 are in turn connected to leads in the cable 21'. Thus electrical energy transmitted through the wires 64, brushes 70, plates 49, 50 and conductors 47, 48 pass through the resistance wires 74 to heat the heating element 40. The operator, when using this device causes the cutting edge 44 to move continuously over the fabric being cut. Since a new portion of the cutting edge 44 engages the fabric in every position, the heat at the point of tangency may be maintained at a substantially uniform temperature in excess of 1500° F.

What is claimed is:

1. A means for severing and simultaneously fusing the severed edges of fabric materials having a thermoplastic fiber content comprising an elongated heating member having an arcuate portion greater than 180° and terminating in adjacent ends having a resistance wire extending longitudinally through said heating member, an arcuate knife edge having an arcuate length of at least substantially 90° F. integral with the outer periphery of said heating member, means for electrically connecting said resistance wire at said ends to a power source, means forming a casing for said last-mentioned means and a support for said heating member said casing interengaging said heating member at said ends and spaced from said arcuate portion and a handle secured to said casing and extending away from said arcuate portion.

2. A means for severing and simultaneously fusing the severed edges of fabric material having a thermoplastic fiber content comprising an elongated arcuately shaped heating member adapted to be heated to approximately 1500° F. and having a resistance wire extending therethrough, an annular knife edge concentric with and integrally joined to the outer periphery of said arcuately shaped heating member, a hub supporting said edge and heating member and positioned at the center thereof, journal means supporting said hub for rotation whereby said edge and heating member may be rotated about their common center, means for continuously electrically connecting said resistance wire to an external power source including a brush assembly and conductor elements at said hub, means supporting said conductor elements and said journal means including a casing positioned outside of said heating member and a handle secured to said casing and extending outwardly from said heating member.

3. A means for severing and simultaneously fusing the severed edges of fabric material having a thermoplastic fiber content comprising an elongated arcuately shaped heating member adapted to be heated to approximately 1500° F. and having a resistance wire extending therethrough, an arcuate knife edge having an arcuate length of at least substantially 90° integral with the outer periphery and adapted to be heated to approximately the temperature of said heating member, means for electrically connecting said resistance wire to a power source, means at least in part encasing said last-mentioned means and supporting said heating member, a stand having a roller at one end with the axis of the roller normal to the plane of said knife edge and with the other end of said stand secured in said encasing means, and a handle forming an angle with said stand to form a support secured to said encasing means.

4. A device as set forth in claim 2 including a stand having a roller at one end with the axis of the roller normal to the plane of said knife edge and with the other end of said stand secured to said casing, and said handle forming an angle with said stand to form a support.

References Cited in the file of this patent

UNITED STATES PATENTS

| | | |
|---|---|---|
| 1,954,057 | Oliver | Apr. 10, 1934 |
| 2,551,811 | Mueller | May 8, 1951 |
| 2,701,835 | Anton | Feb. 8, 1955 |
| 2,711,779 | Carland | June 28, 1955 |
| 2,794,485 | Ashton | June 4, 1957 |
| 2,924,694 | Kreider | Feb. 9, 1960 |